United States Patent
Sadowski et al.

(10) Patent No.: US 10,592,207 B2
(45) Date of Patent: *Mar. 17, 2020

(54) DYNAMIC VARIABLE PRECISION COMPUTATION

(71) Applicant: ADVANCED MICRO DEVICES, INC., Santa Clara, CA (US)

(72) Inventors: Greg Sadowski, Boxborough, MA (US); Wayne Burleson, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,055

(22) Filed: Apr. 8, 2019

(65) Prior Publication Data
US 2019/0235838 A1 Aug. 1, 2019

Related U.S. Application Data

(63) Continuation of application No. 15/298,938, filed on Oct. 20, 2016, now Pat. No. 10,296,292.

(51) Int. Cl.
*G06F 7/48* (2006.01)
*G06F 7/72* (2006.01)

(52) U.S. Cl.
CPC ............ *G06F 7/4824* (2013.01); *G06F 7/729* (2013.01)

(58) Field of Classification Search
None
See application file for complete search history.

(56) References Cited

U.S. PATENT DOCUMENTS

| | | | | |
|---|---|---|---|---|
| 2003/0140072 | A1* | 7/2003 | Hoskote | G06F 7/4991 708/1 |
| 2004/0143619 | A1* | 7/2004 | Grinchuk | G06F 7/38 708/706 |
| 2005/0080835 | A1* | 4/2005 | Ohmi | G06F 7/4824 708/700 |

(Continued)

FOREIGN PATENT DOCUMENTS

EP   0606611 B1   4/2000

OTHER PUBLICATIONS

International Preliminary Report on Patentability dated May 2, 2019 for International application No. PCT/US2017/057000, 6 pages.

*Primary Examiner* — Michael D. Yaary (57) ABSTRACT

A conversion unit converts operands from a conventional number system that represents each binary number in the operands as one bit to redundant number system (RNS) operands that represent each binary number as a plurality of bits. An arithmetic logic unit performs an arithmetic operation on the RNS operands in a direction from a most significant bit (MSB) to a least significant bit (LSB). The arithmetic logic unit stops performing the arithmetic operation prior to performing the arithmetic operation on a target binary number indicated by a dynamic precision associated with the RNS operands. In some cases, a power supply provides power to bit slices in the arithmetic logic unit and a clock signal generator provides clock signals to the bit slices. Gate logic is configured to gate the power or the clock signals provided to a subset of the bit slices.

20 Claims, 5 Drawing Sheets

(56) References Cited

U.S. PATENT DOCUMENTS

2007/0203962 A1* 8/2007 Hirairi ............... G06F 7/5332
708/7
2015/0339103 A1* 11/2015 Olsen ............... G06F 9/30025
708/491

* cited by examiner

DYNAMIC VARIABLE PRECISION COMPUTATION

The presentation application is a continuation application of U.S. patent application Ser. No. 15/298,938, entitled "Dynamic Variable Precision Computation" and filed on Oct. 20, 2016, the entirety of which is incorporated by reference herein.

STATEMENT REGARDING FEDERALLY SPONSORED RESEARCH OR DEVELOPMENT

This invention was made with government support under FastForward-2 Node Architecture (NA) Project with Lawrence Livermore National Laboratory (Prime Contract No. DE-AC52-07NA27344, Subcontract No. B609201 awarded by the Department of Energy. The government has certain rights in the invention.

BACKGROUND

Laptop computers, tablet computers, smart phones, and other computing devices rely on limited power supplies such as internal batteries. Although the batteries are typically rechargeable, the operational time interval between charges can be extended using the stored power of the batteries efficiently. Wall-powered computers such as servers, cloud computing resources, and embedded computers are also increasingly power-constrained due to the costs of power, cooling, and thermal management. Arithmetic logic units implemented in the computing devices perform arithmetic operations on operands that are represented by different numbers of bits to achieve different precisions including double precision floating point (64 bits), single precision floating point (32 bits), and half-precision floating point (16 bits). The power dissipated in the arithmetic logic unit is higher when the arithmetic logic unit is operating at higher precision and lower when the arithmetic logic unit is operating at lower precision.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Numerical computations frequently waste power by performing unnecessarily precise computations, even though many applications including neural networks and signal processing applications can tolerate some loss of precision. The operational time interval of a battery in a computing device can therefore be extended by performing some arithmetic operations at lower precision. For example, a programmer can specify that some operations are to be performed at half-precision instead of double precision. However, the precision of arithmetic operations is typically determined when code is compiled for execution by the computing device. The precision of arithmetic operations in the compiled code cannot be modified while the code is executing.

The operational time interval of a power supply such as a battery in a computing device can be extended by dynamically modifying the precision of arithmetic operations performed by the computing device. To support dynamic modification of arithmetic precision, operands are converted from a conventional number system that represents each binary number as one bit to a redundant number system (RNS) that represents each binary number as a plurality of bits, which allows computations to be performed in a direction from the most significant bit (MSB) to the least significant bit (LSB). Each of the RNS operands is associated with a dynamic precision that is represented by a number of bits corresponding to target accuracies of operations performed on the RNS operand. In some embodiments, the dynamic precision is determined based on a data type (e.g., data types that represent graphics objects or primitives include video, RGB color, scene depth, or vertex position data) or statistics that represent data values (e.g., statistical measures that indicate that the data values cluster around the value such as 1 or 0, the data values are in a particular range, or the data values have a mean or median value that is above or below a threshold value). The dynamic precision can also be varied at runtime, e.g., in response to changes in a battery level, changes in the target accuracy, and the like. In some embodiments, the dynamic precision is different for each RNS operand. The dynamic precision for each RNS operand is indicated in a data structure that includes the dynamic precision and the value of the RNS operand.

Arithmetic operations are performed on the binary numbers in the RNS operands in a direction from the most significant bit (MSB) to the least significant bit (LSB) for the number of binary numbers indicated by the dynamic precision of the RNS operand. This is referred to as "MSB-first" arithmetic, in contrast to conventional "LSB-first" arithmetic that performs operations on bits proceeding in a direction from the LSB to the MSB. An arithmetic logic unit that performs MSB-first arithmetic includes separate hardware components (referred to herein as bit slices) to perform arithmetic operations on each binary number in the RNS operand. Enable signals are provided to turn on the bit slices corresponding to a portion of the RNS operand indicated by the dynamic precision. Power or clock signals can then be gated for the bit slices that operate on the binary numbers that are less significant than the portion of the RNS operand indicated by the dynamic precision. Performing the arithmetic operations on the RNS operands prevents more than one bit of ripple between the bit slices, e.g., a carry-in bit received by a bit slice from a less significant bit slice does not determine a value of a carry-out bit provided by the bit slice to a more significant bit slice. In some embodiments, conversion of conventional binary numbers to RNS operands and the dynamic modification of the precision of arithmetic operations performed on the RNS operands are selectively performed based on a comparison of the overhead needed to perform the conversion and the expected power savings produced by the dynamic modification of the precision.

Figure 1:
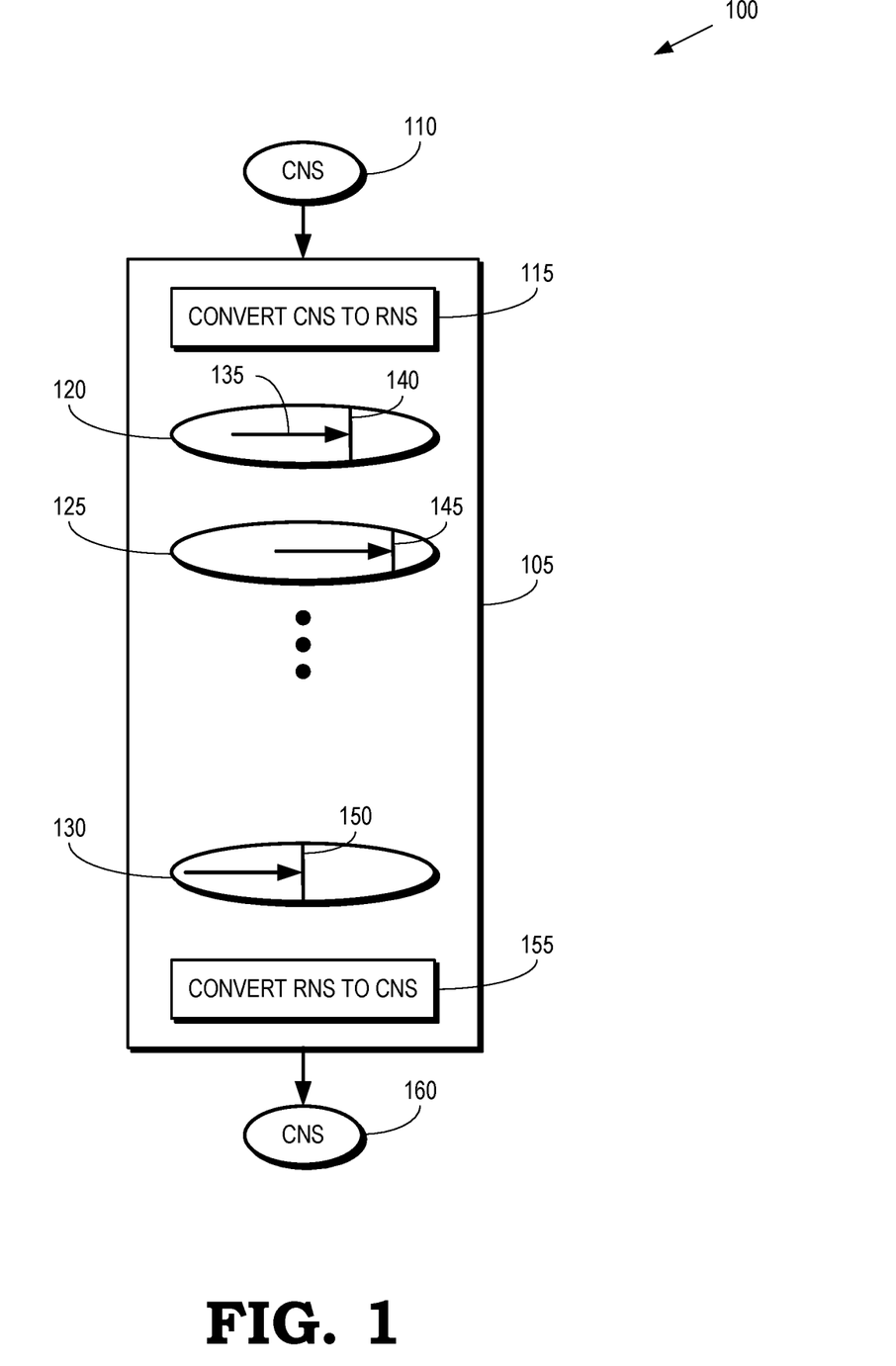
FIG. 1 is a block diagram of a computing device according to some embodiments

FIG. 1 is a block diagram of a computing device 100 according to some embodiments. The computing device 100 includes a set of hardware components 105 that are configured to convert conventional binary numbers into RNS operands and perform arithmetic operations on the RNS operands using MSB-first arithmetic. Examples of arithmetic operations that can be performed by the hardware components 105 include addition, subtraction, multiplication, and division. Furthermore, more complex functions including transcendental functions can be implemented based on the addition, subtraction, multiplication, and division functions. The hardware components 105 are therefore able to perform the more complex functions using MSB-first arithmetic. Some embodiments of the hardware components 105 are implemented using processing units such as central processing units (CPUs), graphics processing units (GPUs), or accelerated processing units (APUs) that are fabricated on a substrate or die. The hardware components 105 can also be implemented as application-specific integrated circuits (ASICs), field programmable gate arrays (FPGAs), digital signal processors (DSPs), or other combinations of hardware components such as transistors, capacitors, resistors, traces, wires, and the like.

The hardware components 105 are configured to receive one or more operands 110 that are formatted according to a conventional numbering system (CNS). Some embodiments of the operands 110 are represented in a binary format using a sequence of binary numbers such as 1, 2, 4, 8, . . . . Each binary number in the operand 110 is represented as a single bit and the values of the bits indicate the value of the operand. For example, an operand 110 having a value of one can be represented as 0001 in the CNS.

A conversion unit 115 is implemented in the hardware components 105 and configured to convert conventional operands into RNS operands in which each binary number is represented by a plurality of bits. For example, a redundant binary representation of the operands 110 can represent each binary number as two bits and the values of the binary numbers can be determined using a translation table such as Table 1. An operand having a value of one can be represented as an RNS operand using different values for the binary numbers including 01-01-01-11 (0+0+0+1=1), 01-01-10-11(0+0+0+1=1), 01-01-11-00 (0+0+2-1=1), or 11-00-00-00 (8-4-2-1=1). Other embodiments of the conversion unit 115 can convert conventional operands into RNS operands using different redundant numbering systems.

TABLE 1

| Binary Number | Value |
|---|---|
| 00 | −1 |
| 01 | 0 |
| 10 | 0 |
| 11 | 1 |

Conversion of conventional operands into RNS operands allows computations to be performed on the RNS operands in a direction from the most significant bit (MSB) to the least significant bit (LSB). Arithmetic operations can also be performed faster on RNS operands. However, conversion of the operands 110 into RNS operands by the conversion unit 115 incurs overhead such as additional processing time and power that is needed to perform the conversion. Some embodiments of the conversion unit 115 therefore selectively perform the conversion of the operands 110 based on a comparison of the incurred overhead and the benefits of performing the arithmetic operations on the RNS operands. For example, the resources needed to perform the conversion can be compared to the resources that are saved by speeding up the arithmetic operations. For another example, the resources needed to perform the conversion can be compared to the resources that are saved by only performing arithmetic operations on a set of most significant binary numbers in the RNS operands, and bypassing performing the arithmetic operations on a complementary set of less significant binary numbers in the RNS operands. In some embodiments, a completion detection circuit such as a configurable delay line is included in the hardware components 105 and used to detect completion of arithmetic operations that are stopped or terminated prior to operating on all of the binary numbers in the RNS operands, as discussed herein.

The hardware components 105 are able to perform a set of arithmetic operations 120, 125, 130 on the RNS operands generated by the conversion unit 115. The arithmetic operations 120, 125, 130 can be performed in sequence, e.g., the result of the arithmetic operation 120 becomes an input for the arithmetic operation 125. The arithmetic operations 120, 125, 130 can also represent operations that are performed on different, overlapping, or partially overlapping sets of the RNS operands. In some embodiments, the arithmetic operations 120, 125, 130 are performed by an arithmetic logic unit (not shown in FIG. 1) that is implemented in the hardware components 105. The arithmetic operations 120, 125, 130 can also be performed by different arithmetic logic units or other hardware configured to perform MSB-first arithmetic.

The arithmetic operations 120, 125, 130 are performed using MSB-first arithmetic on RNS operands, as indicated by the left pointing arrows 135 (only one indicated by a reference numeral in the interest of clarity). Thus, each of the arithmetic operations 120, 125, 130 begins by performing the arithmetic operation on the bits that represent the most significant binary number in the RNS operands. The arithmetic operations 120, 125, 130 then perform the arithmetic operation on the bits that represent the next most significant binary number. Each iteration of the arithmetic operation therefore monotonically increases the accuracy of the results of the arithmetic operation. In an RNS arithmetic operation, the arithmetic operations 120, 125, 130 can proceed to perform the arithmetic operations on less significant binary numbers until the arithmetic operation had been performed on all of the binary numbers in the RNS operands.

However, as discussed herein, not all applications require the highest level of accuracy provided by the arithmetic operations 120, 125, 130. Performing the arithmetic operations on all of the binary numbers in the RNS operands can therefore unnecessarily consume power, which may be a limited resource for the hardware components 105. The hardware components 105 are therefore configured to stop, terminate, or interrupt the arithmetic operations 120, 125, 130 prior to performing the arithmetic operation on a target binary number that is indicated by a dynamic precision. The target binary number represents a threshold significance, such that arithmetic operations are not performed on binary numbers that are less significant than the threshold significance. Interrupting the arithmetic operations 120, 125, 130 reduces the accuracy of the results of the arithmetic operations 120, 125, 130, but also reduces the power consumption of the hardware components 105.

The dynamic precision associated with an RNS operand or arithmetic operation can be modified at runtime and may be different for different RNS operands or arithmetic operations 120, 125, 130. For example, the lines 140, 145, 150 represent the target binary number for the corresponding arithmetic operations 120, 125, 130. The arithmetic operation 125 therefore achieves the highest accuracy (and consumes the largest fraction of the total power that would be consumed if the operation 125 was performed on all the binary numbers in the RNS operand), the arithmetic operation 120 achieves the next highest accuracy (and consumes the next largest fraction of the total power that would have been consumed by the operation 120 if performed on all the binary numbers in the RNS operand), and the arithmetic operation 130 achieves the lowest accuracy (but consumes the lowest fraction of the total power that would have been consumed by the operation 130 if performed on all the binary numbers in the RNS operand).

The hardware components 105 also include a conversion unit 155 for converting the RNS operands into operands 160 that are represented according to a conventional numbering system (CNS). For example, some or all of the arithmetic operations 120, 125, 130 can provide results in the RNS format to the conversion unit 155, which converts the RNS results into the operands 160. In some embodiments, the conversion unit 115 selectively converts the operands 110 into RNS operands based in part on the overhead required to convert the RNS results back into CNS operands 160.

Figure 2:
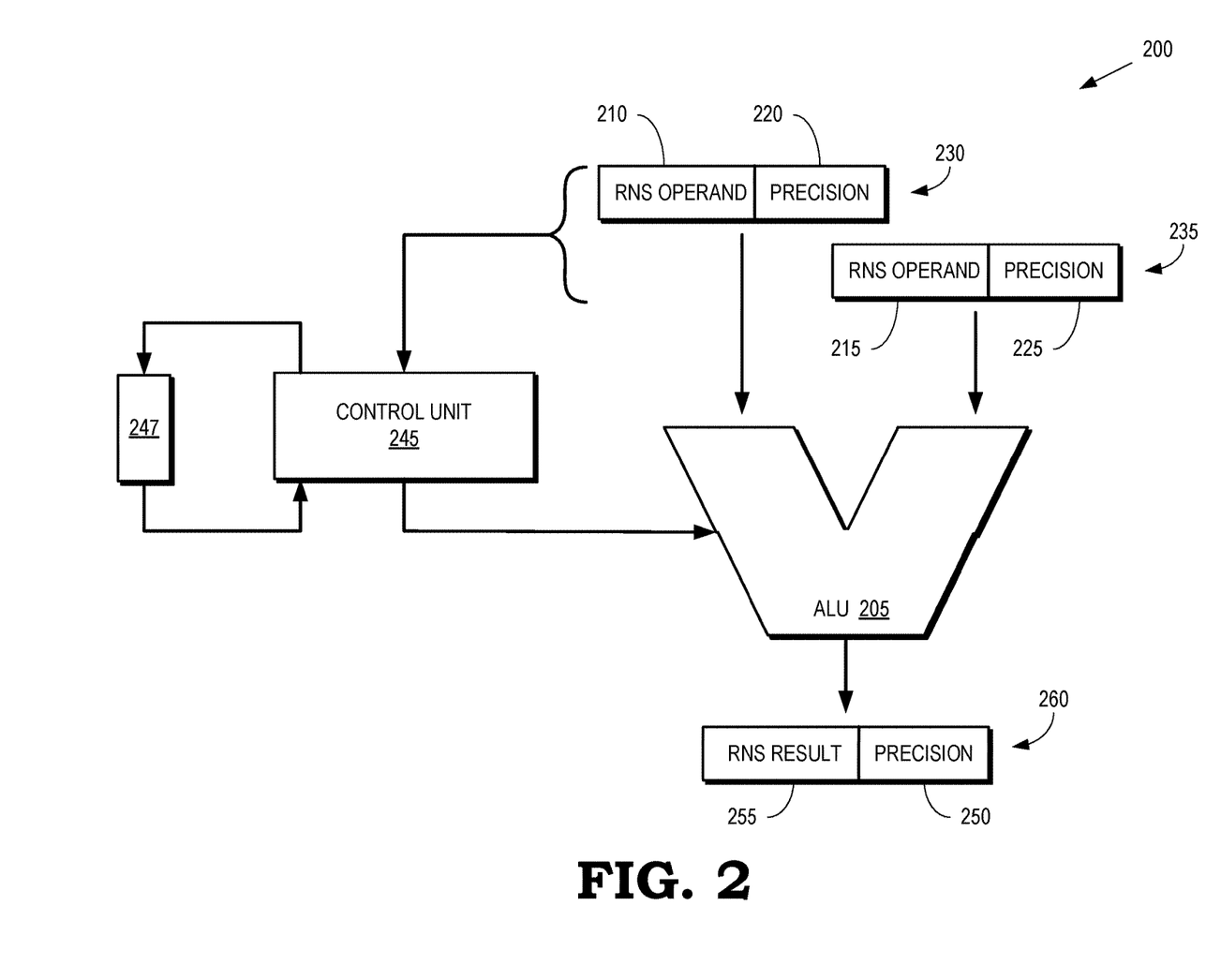
FIG. 2 is a block diagram of a computing device that includes an arithmetic logic unit that is configured to perform arithmetic operations on redundant number system (RNS) operands using most significant bit first (MSB-first) arithmetic according to some embodiments.

FIG. 2 is a block diagram of a computing device 200 that includes an arithmetic logic unit (ALU) 205 that is configured to perform arithmetic operations on RNS operands 210, 215 using MSB-first arithmetic according to some embodiments. The arithmetic logic unit 205 is implemented in some embodiments of the hardware components 105 shown in FIG. 1. The arithmetic logic unit 205 can therefore be used to perform one or more arithmetic operations including addition, subtraction, multiplication, or division on the RNS operands 210, 215. Furthermore, some embodiments of the arithmetic logic unit 205 are configured to perform complex functions including transcendental functions on the RNS operands 210, 215 using MSB-first arithmetic. Although the arithmetic logic unit 205 shown in FIG. 2 receives two RNS operands 210, 215, some embodiments of the arithmetic logic unit 205 can receive and operate on more than two RNS operands.

The RNS operands 210, 215 are associated with respective dynamic precisions 220, 225. In the illustrated embodiment, the values of the RNS operands 210, 215 and the respective dynamic precisions 220, 225 are provided to the arithmetic logic unit 205 in corresponding data structures 230, 235. For example, the data structures 230, 235 can be a specifically defined instruction word, such as a variation of a very long instruction word, that is configured to hold values of the RNS operands 210, 215 and the respective dynamic precisions 220, 225. However, in some embodiments, the RNS operands 210, 215 and the respective dynamic precisions 220, 225 are provided to the arithmetic logic unit 205 in different data structures. Furthermore, in some embodiments, the dynamic precisions 220, 225 are not provided directly to the arithmetic logic unit 205 or the control unit 245. Instead, hints that indicate the dynamic precisions 220, 225 are provided to the arithmetic logic unit 205. The hints can be defined to include less information than the dynamic precisions 220, 225 and the hints can be selectively used in place of the full dynamic precisions 220, 225 in operating modes such as low power modes of the computing device 200. The hints can be provided by an application using an interface between the application and the hardware that is used to implement the arithmetic logic unit 205 and the control unit 245.

A control unit 245 accesses values of the dynamic precisions 220, 225 and, in some cases, values of the RNS operands 210, 215. The control unit 245 then provides control signaling to the arithmetic logic unit 205 that is generated responsive to the values of the dynamic precisions 220, 225, and, in some cases, the values of the RNS operands 210, 215. The control signaling instructs the arithmetic logic unit 205 to perform an arithmetic operation on the binary numbers represented by the values of the RNS operands 210, 215 using MSB-first arithmetic, e.g., by performing the arithmetic operations in a direction from a most significant bit (MSB) to a least significant bit (LSB).

The control unit 245 also provides control signaling that instructs the arithmetic logic unit 205 to stop performing the arithmetic operation prior to performing the arithmetic operation on a target binary number indicated by the dynamic precisions 220, 225 associated with the RNS operands 210, 215. For example, if the RNS operands 210, 215 are provided to the arithmetic logic unit 205 in single precision floating point format (e.g., represented by 32 bits in the conventional binary numbering system and 32 binary numbers represented by multiple bits in RNS) and the dynamic precisions 220, 225 indicate that the 30 most significant binary numbers provide sufficient precision, the control unit 245 instructs the arithmetic logic unit to stop performing the arithmetic operation prior to performing the arithmetic operation on the 31-st binary number in order from most significant to least significant. In some embodiments, the control unit 245 selectively instructs the arithmetic logic unit 205 to stop performing the arithmetic operation at the target binary number based on a power consumption status of the computing device 200. For example, the control unit 245 can be configured to bypass instructing the arithmetic logic unit 205 to stop performing the arithmetic operation in response to the computing device 200 being in a power consumption mode that does not require power conservation. For another example, the control unit 245 can be configured to instruct the arithmetic logic unit 205 to stop performing the arithmetic operations in response to the computing device being in a power consumption mode that requires power conservation, such as a mode that is triggered by a battery level falling below a threshold.

In some embodiments, the computing device 200 includes a configurable delay line 247 that is dynamically configured to measure the execution time of the arithmetic operations performed by the arithmetic logic unit 205 based on the dynamic precisions 220, 225. For example, the control unit 245 can transmit a pulse (or edge) into the configurable delay line 247 in response to the arithmetic logic unit 205 initiating the arithmetic operation on the RNS operands 210, 215. The control unit 245 then determines that the arithmetic operation has completed in response to the pulse (or edge) appearing on the output of the configurable delay line 247. The control unit 245 configures the configurable delay line 247 based on the dynamic precisions 220, 225 so that the time interval required for the pulse (or edge) to propagate through the configurable delay line 247 and return to the control unit 245 is equal to the time interval required for the arithmetic logic unit 205 to perform the arithmetic operation on the RNS operands 210, 215 to the precision indicated by the dynamic precisions 220, 225.

Some embodiments of the control unit 245 determine the values of the dynamic precisions 220, 225 based on characteristics of the data stored in the RNS operands 210, 215. For example, the dynamic precisions 220, 225 can be determined based on a data type so that different levels of precision are utilized for data types that represent graphics objects or primitives that include video, RGB color, scene depth, or vertex position data. For another example, the dynamic precisions 220, 225 can be determined based on statistics that represent properties of the binary numbers in the RNS operands 210, 215, as well as other RNS operands that were previously received by the arithmetic logic unit 205. The statistics can include statistical measures that indicate that the binary numbers cluster around a value such as 1 or 0, the binary numbers have a mean or a median value that is in a particular range, the binary numbers have a mean or median value that is above or below a threshold value, and the like.

Some embodiments of the control unit 245 determine or modify the dynamic precisions 220, 225 at runtime. For example, the control unit 245 can modify one or more of the dynamic precisions 220, 225 in response to changes in a battery level, changes in the target accuracy, and the like. Increasing the dynamic precisions 220, 225 typically leads to increased power consumption and is therefore performed in response to an increase in a battery level. Decreasing the dynamic precisions 220, 225 typically leads to decreased power consumption and is therefore performed in response to a decrease in a battery level, e.g., below a threshold that indicates a low battery level. In some embodiments, the dynamic precisions 220, 225 are different for the RNS operand 210, 215.

The arithmetic logic unit 205 can also be configured to determine or modify precisions in response to performing arithmetic operations on the RNS operands 210, 215. Some embodiments of the arithmetic logic unit 205 generate dynamic precisions 250 for RNS results 255 of the arithmetic operations performed on the RNS operands 210, 215. For example, the arithmetic logic unit 205 can set the dynamic precision 250 to the lower of the dynamic precisions 220, 225. The dynamic precision 250 and the RNS result 255 are then output from the arithmetic logic unit 205, e.g., in a data structure 260.

Figure 3:
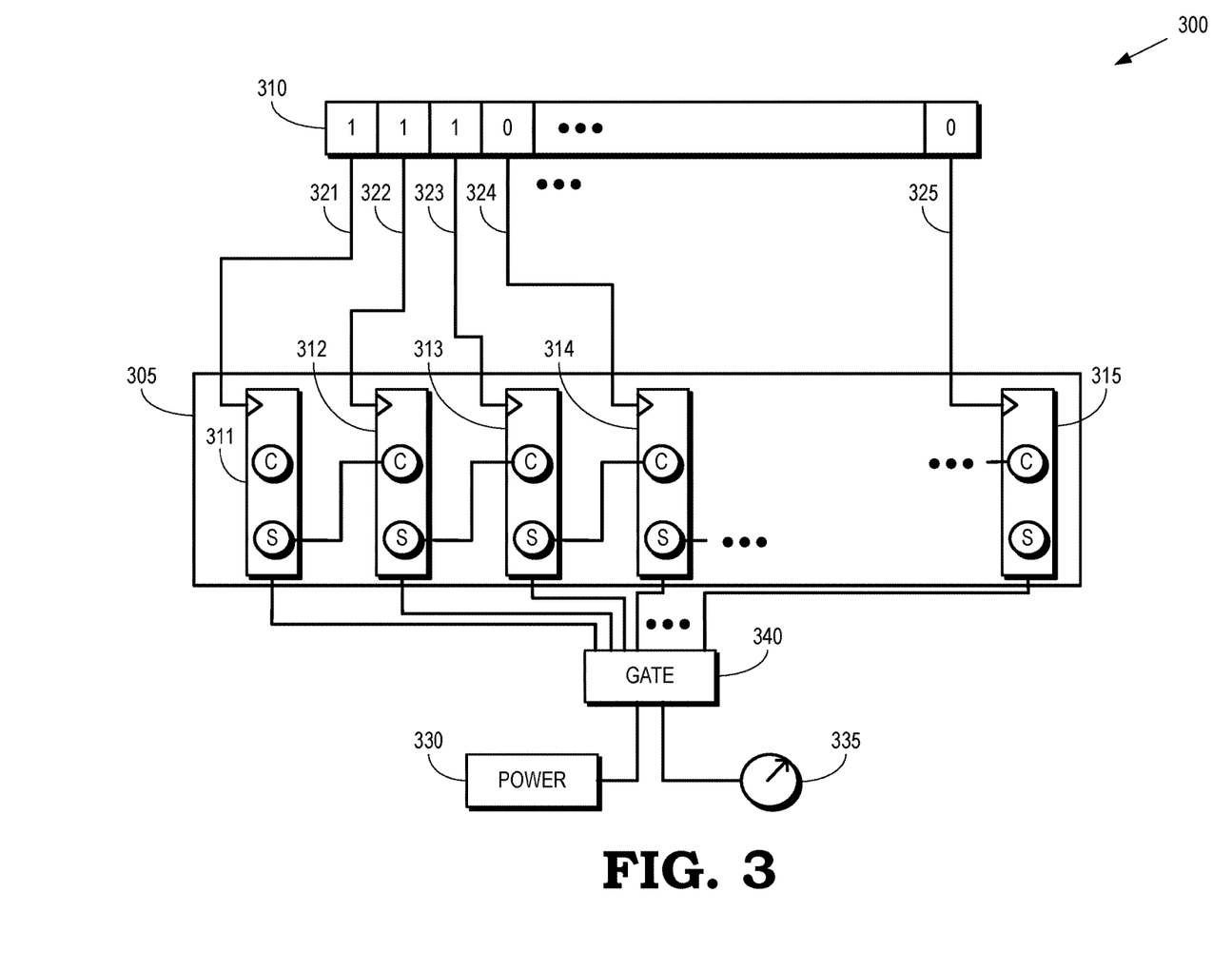
FIG. 3 is a block diagram of a computing device that implements an arithmetic logic unit that is selectively enabled based on a dynamic precision according to some embodiments.

FIG. 3 is a block diagram of a computing device 300 that implements an arithmetic logic unit 305 that is selectively enabled based on a dynamic precision 310 according to some embodiments. The arithmetic logic unit 305 includes a plurality of bit slices 311, 312, 313, 314, 315 (collectively referred to herein as "the bit slices 311-315") that operate on different binary numbers of RNS operands. The bit slices 311-315 shown in FIG. 3 are arranged in order of significance of the bits in the associated binary numbers from the most significant bit (at the left) to the least significant bit (at the right). The dynamic precision 310 encodes the precision using a thermometer code that sets a number of most significant bits to a value (such as "1") to represent the precision and sets the remainder of less significant bits to a complementary value (such as "0").

Each of the bit slices 311-315 includes a hardware component (S) configured to perform an arithmetic operation (such as a sum) on the corresponding binary numbers of the RNS operands received by the arithmetic logic unit 305. Each of the bit slices 311-315 also includes a hardware component (C) that is configured to generate a carry bit that is provided to the next most significant bit slice. The carry bit is referred to as a carry-out bit when it is provided from a bit slice and a carry-in bit when it is received by the bit slice. The hardware components (S) utilize the value of the carry-in bit to perform the arithmetic operation. However, the bit slices 311-315 are configured to prevent more than one bit of ripple between the bit slices 311-315, e.g., a carry-in bit received by a bit slice from a less significant bit slice does not determine a value of a carry-out bit generated by the hardware component (C) and provided by the bit slice to a more significant bit slice.

The bit slices 311-315 are selectively enabled to perform arithmetic operations based on the dynamic precision 310, which is represented by values of a series of bits. Enable signals 321, 322, 323, 324, 325 (collectively referred to herein as "the enable signals 321-325") are generated on the basis of the values of the bits in the dynamic precision 310 and provided to the corresponding bit slices 311-315. In the illustrated embodiment, a value of "1" in a bit of the dynamic precision 310 indicates that the corresponding bit slice is enabled to perform the arithmetic operation and a value of "0" in a bit indicates that the corresponding bit slice is disabled and therefore not used to perform the arithmetic operation on the corresponding binary number. For example, enable signals 321-323 are provided to the corresponding bit slices 311-313 to enable the bit slices 311-313 to perform arithmetic operations on binary numbers of an RNS operand. Enable signals 324, 325 are not provided to the corresponding bit slices 314, 315 and so the bit slices 314, 315 do not perform arithmetic operations on the corresponding binary numbers. In some embodiments, the hardware component (C) of the most significant of the disabled bit slices (e.g., the bit slice 314 shown in FIG. 3) generates a carry-out bit to support rounding operations even though the hardware component (S) of the disabled bit slice does not perform the arithmetic operation on the binary number. Selectively enabling or disabling the bit slices 311-315 reduces the power consumption of the computing device 300 by reducing the amount of power consumed by the disabled bit slices.

The computing device 300 includes a power supply 330 to supply power to the arithmetic logic unit 305 and a clock signal generator 335 to provide a clock signal to the arithmetic logic unit 305. Gate logic 340 is implemented in the computing device 300 using transistors, switches, routers, and the like and operates under the control of a control unit such as the control unit 245 shown in FIG. 2. The gate logic 340 selectively gates the power supplied to the bit slices 311-315 by the power supply 330 or the clock signal supplied by the clock signal generator 335 based on the dynamic precision 310. For example, the gate logic 340 provides power and clock signals to the enabled bit slices 311-313 and gates the power or clock signals for the disabled bit slices 314, 315 so that the disabled bit slices 314, 315 do not receive power or clock signals from the power supply 330 or the clock signal generator 335, respectively. Selectively gating the power or clock signals provided to the bit slices 311-315 based on the dynamic precision 310 further reduces the power consumption of the computing device 300 by further reducing the amount of power consumed by the disabled bit slices.

Figure 4:
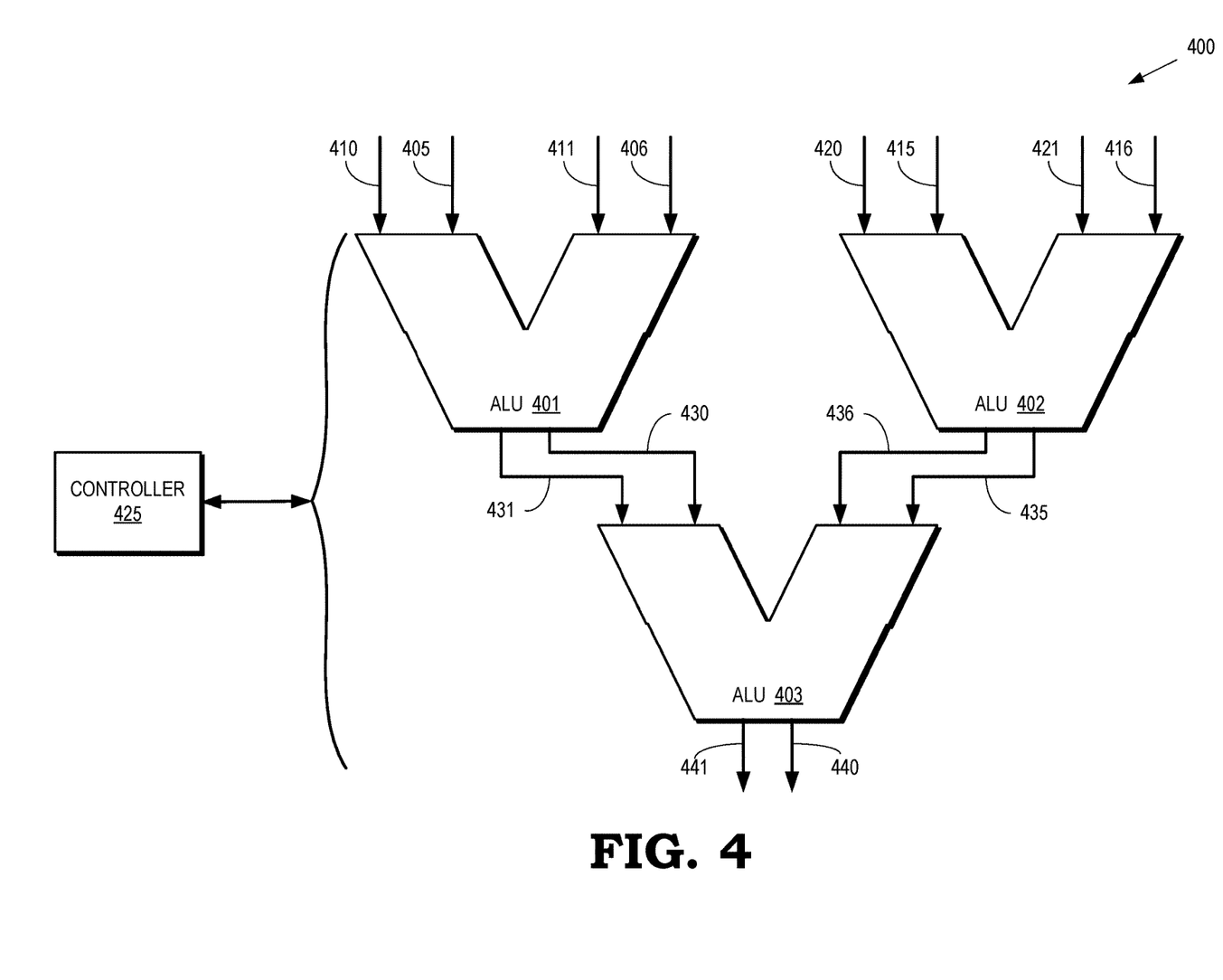
FIG. 4 is a block diagram of a computing device that propagates errors associated with RNS operands according to some embodiments.

FIG. 4 is a block diagram of a computing device 400 that propagates errors associated with RNS operands according to some embodiments. The computing device 400 is implemented in some embodiments of the computing device 100 shown in FIG. 1 or the computing device 200 shown in FIG. 2. The computing device 400 includes a plurality of arithmetic logic units 401, 402, 403 that are collectively referred to herein as "the arithmetic logic units 401-403." The arithmetic logic units 401-403 shown in FIG. 4 can represent three distinct hardware components of the computing device 400 or they can represent a single hardware component of the computing device 400 that is used to perform three separate arithmetic operations. Furthermore, the number of arithmetic logic units 401-403 or the number of hardware components used to implement the arithmetic logic units 401-403 (or other arithmetic logic units) in the computing device 400 can be larger or smaller than the number shown in FIG. 4.

The arithmetic logic units 401-403 receive input RNS operands and information indicating the accumulated error associated with the RNS operand. For example, the arithmetic logic unit 401 receives the input RNS operands 405, 406 and the corresponding accumulated errors 410, 411 and the arithmetic logic unit 402 receives the input RNS operands 415, 416 and the corresponding accumulated errors 420, 421. In some embodiments, the accumulated errors 410, 411, 420, 421 are used to establish a dynamic precision for the arithmetic operations performed by the arithmetic logic units 401, 402. The arithmetic logic units 401, 402 (or a corresponding controller 425) can configure the dynamic precision used by the arithmetic logic units 401, 402 to perform arithmetic operations on the input RNS operands 405, 406, 415, 416 so that the dynamic precision of the arithmetic operations is not more precise than necessary for the associated accumulated errors 410, 411, 420, 421. For example, if the accumulated errors 410, 411, 420, 421 for the input RNS operands 405, 406, 415, 416 are less than or equal to a value indicated by the four least significant binary numbers in the input RNS operands 405, 406, 415, 416, the dynamic precisions for the input RNS operands 405, 406, 415, 416 are set to correspond to the binary numbers that are more significant than the fourth least significant binary number.

The arithmetic logic units 401-403 generate output RNS operands 430, 435, 440 and corresponding accumulated errors 431, 436, 441. For example, the output RNS operands 430, 435 are generated by performing the arithmetic operations on the input RNS operands 405, 406, 415, 416 and the accumulated errors 431, 436 are determined based on the arithmetic operations using conventional error estimation/accumulation techniques. The output RNS operands 430, 435 and the corresponding accumulated errors 431, 436 are provided as input values to the arithmetic logic unit 403, which performs arithmetic operations on the RNS operands 430, 435 to generate the output RNS operand 440. The arithmetic logic unit 403 also uses conventional error estimation/accumulation techniques to determine the accumulated error 441 based on the input accumulated errors 431, 436. In some embodiments, the accumulated error 441 is used to determine the dynamic precision used to determine the value of the output RNS operand 440.

Figure 5:
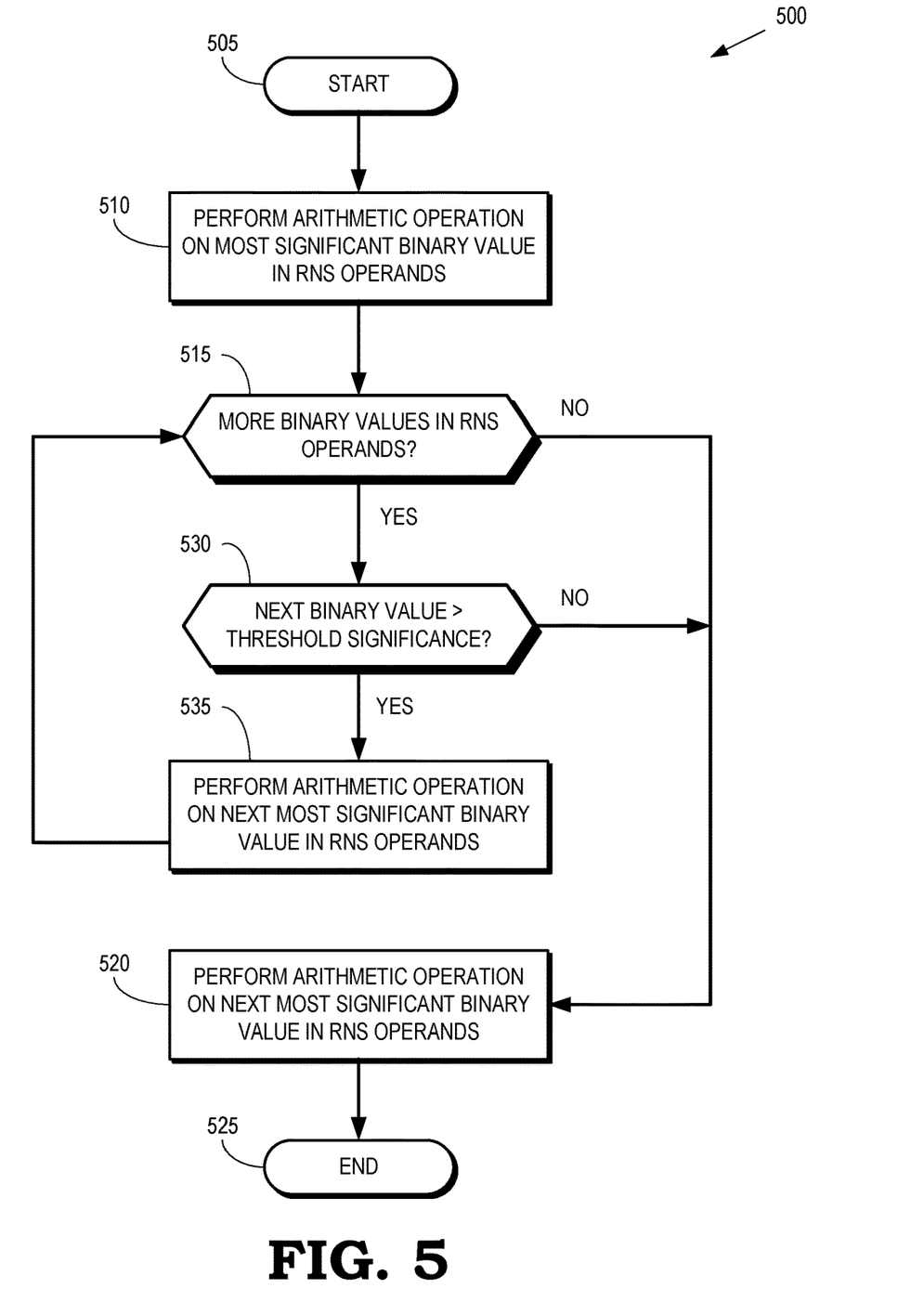
FIG. 5 is a flow diagram of a method of performing dynamic variable precision arithmetic operations on RNS operands according to some embodiments.

FIG. 5 is a flow diagram of a method 500 of performing dynamic variable precision arithmetic operations on RNS operands according to some embodiments. The method 500 is performed by arithmetic logic units that are implemented in some embodiments of the computing device 100 shown in FIG. 1, the computing device 200 shown in FIG. 2, the computing device 300 shown in FIG. 3, and the computing device 400 shown in FIG. 4. The method 500 begins at start block 505.

At block 510, the arithmetic logic unit performs an arithmetic operation on the most significant binary number in the input RNS operands. As discussed herein, examples of the arithmetic operations include addition, subtraction, multiplication, and division, as well as more complex functions including transcendental functions that can be implemented based on the addition, subtraction, multiplication, and division functions.

At decision block 515, the arithmetic logic unit determines whether there are more binary numbers in the RNS operands that have not yet been used to perform arithmetic operations. If not, the method 500 flows to block 520 and determines a dynamic precision of the result of performing the arithmetic operation on the input RNS operand. The method 500 then flows to end block 525 and the method 500 ends because there are no more binary numbers to operate on and the arithmetic operation is complete. If the arithmetic logic unit determines that there are more binary numbers in the RNS operands, the method flows to decision block 530.

At decision block 530, the arithmetic logic unit determines whether the next binary number, i.e., a binary number that is less significant than the binary number that was previously operated on, is more significant than a threshold significance indicated by the dynamic precision associated with the RNS operands. For example, as discussed herein, the dynamic precision can be represented using a thermometer encoded array of bits that each correspond to a binary number in the RNS operands. Bit slices in the arithmetic logic unit that operate on binary numbers that are more significant than the threshold significance (or target binary number indicated by the dynamic precision) are enabled and bit slices that operate on binary numbers that are less significant than the threshold significance are disabled.

If the dynamic precision indicates (at decision block 530) that the next binary number is more significant than the threshold significance, the method 500 flows to block 535 and the arithmetic logic unit performs the arithmetic operation on the next most significant binary number in the RNS operands. The method 500 then flows to decision block 515. If the dynamic precision indicates (at decision block 530) that the next binary number is less significant than the threshold significance, the method 500 flows to block 520 and determines a dynamic precision of the RNS result of performing the arithmetic operation on the input RNS operand. The method 500 then flows to end block 525, thereby stopping the arithmetic operation prior to performing the arithmetic operation on a binary number that is less significant than the threshold significance.

In some embodiments, the apparatus and techniques described above are implemented in a system comprising one or more integrated circuit (IC) devices (also referred to as integrated circuit packages or microchips), such as the computing device described above with reference to FIGS. 1-5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a conversion unit to convert operands from a conventional number system that represents each binary number in the operands as one bit to redundant number system (RNS) operands that represent each binary number as a plurality of bits; and
an arithmetic logic unit to perform an arithmetic operation on the RNS operands in a direction from a most significant bit (MSB) to a least significant bit (LSB) and to stop the arithmetic operation prior to performing the arithmetic operation on a target binary number.

2. The apparatus of claim 1, wherein the arithmetic logic unit further comprises:
a plurality of bit slices, each bit slice being configured to perform the arithmetic operation on one of the binary numbers in the RNS operands.

3. The apparatus of claim 2, wherein a carry-in bit received by a bit slice that operates on a more significant binary number from a bit slice that operates on a less significant binary number does not determine a value of a carry-out bit generated by the bit slice that operates on the more significant binary number.

4. The apparatus of claim 2, further comprising:
a control unit configured to provide enable signals to turn on a first subset of the plurality of bit slices, wherein the first subset operates on binary numbers in the RNS operands that are more significant than the target binary number.

5. The apparatus of claim 4, wherein the control unit is configured to determine a dynamic precision at runtime based on at least one of a data type of the RNS operands, a statistical representation of binary numbers in the RNS operands, or in response to at least one of changes in a battery level, or changes in a target accuracy of a result of the arithmetic operation, and wherein the target binary number is indicated by the dynamic precision.

6. The apparatus of claim 5, wherein the arithmetic logic unit is configured to receive accumulated errors associated with the RNS operands, and wherein the control unit is configured to modify the dynamic precision at runtime based on the accumulated errors.

7. The apparatus of claim 4, wherein the control unit does not provide enable signals to a second subset of the plurality of bit slices that operate on binary numbers in the RNS operands that are equal to or less significant than the target binary number.

8. The apparatus of claim 7, further comprising:
a power supply to provide power to the plurality of bit slices;
a clock signal generator to provide clock signals to the plurality of bit slices; and
gate logic configured to gate at least one of the power or the clock signals provided to the second subset.

9. The apparatus of claim 5, wherein the conversion unit is configured to selectively convert the operands from the conventional number system to the RNS operands based on a comparison of overhead required to perform the conversion and expected power savings produced by stopping the arithmetic operation prior to performing the arithmetic operation on the target binary number indicated by the dynamic precision associated with the RNS operands.

10. A method comprising:
converting operands from a conventional number system that represents each binary number in the operands as one bit to redundant number system (RNS) operands that represent each binary number as a plurality of bits;

performing an arithmetic operation on the RNS operands in a direction from a most significant bit (MSB) to a least significant bit (LSB); and stopping the arithmetic operation prior to performing the arithmetic operation on a target binary number.

11. The method of claim 10, wherein performing the arithmetic operation on the RNS operands comprises independently performing the arithmetic operation on a plurality of binary numbers in the RNS operands using a plurality of bit slices implemented by an arithmetic logic unit, each bit slice being configured to perform the arithmetic operation on one of the binary numbers in the RNS operands.

12. The method of claim 11, wherein performing the arithmetic operation using the plurality of bit slices further comprises:

receiving a carry-in bit at a bit slice that operates on a more significant binary number from a bit slice that operates on a less significant binary number; and providing a carry-out bit from the bit slice that operates on the more significant binary number, wherein the carry-in bit does not determine a value of the carry-out bit.

13. The method of claim 11, further comprising:
providing enable signals to turn on a first subset of the plurality of bit slices, wherein the first subset operates on binary numbers in the RNS operands that are more significant than the target binary number.

14. The method of claim 11, further comprising:
bypassing provision of enable signals to a second subset of the plurality of bit slices that operate on binary numbers in the RNS operands that are equal to or less significant than the target binary number.

15. The method of claim 14, further comprising:
gating at least one of power or clock signals provided to the second subset.

16. The method of claim 10, further comprising:
determining a dynamic precision at runtime based on at least one of a data type of the RNS operands, a statistical representation of binary numbers in the RNS operands, or in response to at least one of changes in a battery level, or changes in a target accuracy of a result of the arithmetic operation; and determining the target binary number based on the dynamic precision.

17. The method of claim 16, further comprising:
receiving accumulated errors associated with the RNS operands; and modifying the dynamic precision at runtime based on the accumulated errors.

18. The method of claim 16, wherein converting the operands from the conventional number system to the RNS operands comprises converting the operands from the conventional number system to the RNS operands based on a comparison of overhead required to perform the conversion and expected power savings produced by stopping the arithmetic operation prior to performing the arithmetic operation on the target binary number indicated by the dynamic precision associated with the RNS operands.

19. An apparatus comprising:
a first conversion unit to convert operands from a conventional number system that represents each binary number in the operands as one bit to redundant number system (RNS) operands that represent each binary number as a plurality of bits;

an arithmetic logic unit to perform a sequence of arithmetic operations, wherein each of the arithmetic operations are performed on the RNS operands in a direction from a most significant bit (MSB) to a least significant bit (LSB), and wherein the arithmetic operations are stopped prior to performing the arithmetic operation on different target binary numbers; and a second conversion unit to convert RNS results of the sequence of arithmetic operations to the conventional number system.

20. The apparatus of claim 19, wherein converting the operands from the conventional number system to the RNS operands comprises converting the operands from the conventional number system to the RNS operands based on a comparison of overhead required to perform the conversion and expected power savings produced by stopping the arithmetic operations prior to performing the arithmetic operations on different target binary numbers indicated by different dynamic precisions associated with the arithmetic operations.

* * * * *